No. 795,669. PATENTED JULY 25, 1905.
J. M. WESLEY & W. H. McCRADY.
WHEEL HUB.
APPLICATION FILED JAN. 18, 1905.
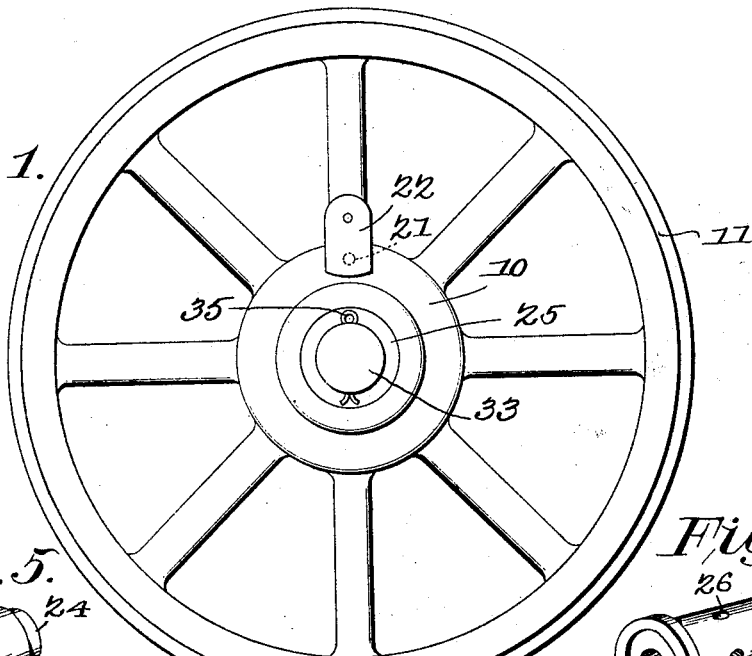
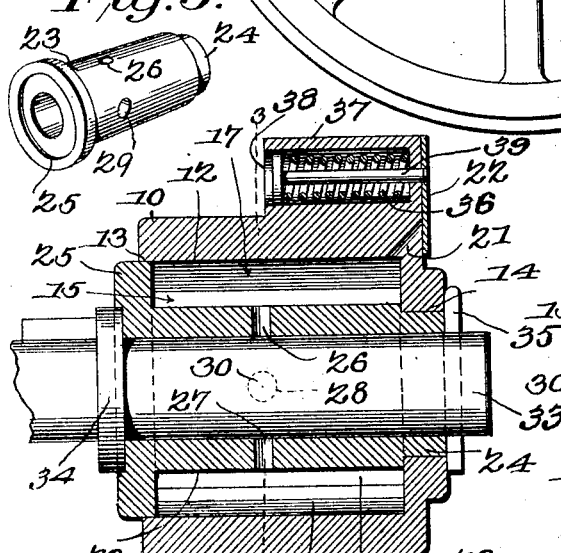
John M. Wesley and
William H. McCrady, Inventors
Witnesses
by C. A. Snow & Co.
Attorneys

UNITED STATES PATENT OFFICE.

JOHN M. WESLEY AND WILLIAM H. McCRADY, OF KYLERTOWN, PENNSYLVANIA.

WHEEL-HUB.

No. 795,669.          Specification of Letters Patent.          Patented July 25, 1905.

Application filed January 18, 1905. Serial No. 241,674.

*To all whom it may concern:*

Be it known that we, JOHN M. WESLEY and WILLIAM H. MCCRADY, citizens of the United States, residing at Kylertown, in the county of Clearfield and State of Pennsylvania, have invented a new and useful Wheel-Hub, of which the following is a specification.

This invention relates to the hubs of wheels, more particularly to the hubs of mine-car wheels and similar vehicles, and has for its object to simplify and improve the construction and produce a device of this character wherein the wearing parts may be quickly and easily renewed and the lubricant supplied uniformly and continuously to the axle-bearings.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of embodiment of the invention capable of carrying the same into practical operation.

In the drawings thus employed, Figure 1 is a side elevation of a wheel with the improved devices embodied therein. Fig. 2 is a longitudinal section of the hub portion, and Fig. 3 is a transverse section on the line 3 3 of Fig. 2. Fig. 4 is a perspective view of the axle-bushing removed. Figs. 5 and 6 are perspective views, on a reduced scale, of modified forms of the axle-bushing.

The improved device may be embodied in various forms of wheels employed upon various forms of vehicles employed for various purposes, but is more particularly applicable to the train-cars and the like used in mining and like operations, and for the purpose of illustration the improvement is shown applied to a wheel of this character; but it will be understood that the invention is not to be limited in any manner to any particular form of wheel or to wheels employed for any particular purpose.

The improvement consists in forming the hub 10 of the wheel 11 with a longitudinal recess 12, with bearings 13 14 at the ends and with the side walls contracted at 15 16, whereby spaces 17 18 are left at the remaining sides of the recess. Formed in the contracted walls of the recess are pin-sockets 19 20, and leading into the space 17 is an oil-duct 21, covered and protected by a cap 22, held in place yieldably by a spring 36, operating in a casing 37 and bearing against the outer end of the casing and also against a head 38 on a rod 39, coupled to the cap. By this means the cap will be held with sufficient force to prevent accidental displacement under the jarring to which the hub may be subjected when in operation.

An axle-bushing 23 is positioned in the recess 12 and provided with a bearing 24 at one end for engaging the recess-bearing 14 and a bearing 25 at the other end for engaging the recess-bearing 13, the sides of the bushing engaging the spaced contracted side portions 15 16 of the recess, as shown in Fig. 3. The bushing is provided with an oil-duct 26, communicating with the space 17, and an oil-duct 27, communicating with the space 18, and also provided with pin-apertures 28 29, registering with the pin-sockets 19 20 for receiving stop-pins 30 31. The axle is provided with the usual journal 33, engaging the bushing 23 and bearing by a collar 34 against the end bearing 25 and held in place by a transverse pin 35 in the usual manner.

To assemble the different parts of the device, the bushing 23 is first inserted into the hub and then the pins 30 31 are inserted into their seats 19 20 and 28 29 from within the bearing of the bushing and the journal 35 then inserted or the wheel with its bushing placed over the journal, as the case may be, the rounded inner ends of the pins 30 31 permitting the outer end of the journal to readily pass them.

With a wheel thus constructed and equipped it is obvious that the bushing is firmly supported in position and held with sufficient firmness to resist the strains to which it will be subjected, while at the same time readily removable when worn or broken, so that the "life" of the wheel can be prolonged materially or until the rim or other parts are worn or broken. The greatest strains and the largest amount of wear coming upon the axle-bearings, it is obvious that the ability to easily and quickly renew the parts subject to the greatest wear and friction is an important consideration, and the improved structure herein described and shown provides a ready means for accomplishing this desirable result.

The relatively large spaces 17 18 within the hub at opposite sides of the bushing serve as reservoirs to hold a relatively large quantity of the lubricant and supply it to the axle-journal as fast as required through the feed-ducts 26 27, as will be obvious. The spaces 17 18 are thus important features of the invention and add materially to the value and effectiveness of the invention.

The bushing will preferably be square or oblong in transverse section, as shown in Figs. 3 and 4, but may be cylindrical, as in Fig. 5, or tapering, as in Fig. 6, if found necessary; but this would not be a departure from the principle of the invention, as the same results would be produced in substantially the same manner.

Having thus described the invention, what is claimed is—

1. A wheel-hub having a longitudinal recess with a relatively contracted bearing at one end and a relatively large bearing at the other end, and with oppositely-disposed pin-sockets in the side walls of the recess, an axle-bushing for position in said recess and with bearings at the ends for engaging the bearings at the ends of said recess and provided with oil-apertures and with pin-apertures for registering with said pin-sockets, and stop-pins for position in said alined apertures to form a coupling means between the bushing and hub.

2. A wheel-hub having a longitudinal recess and with bearings at the ends and with lateral pin-sockets intermediately of the bearings, an axle-bushing for position in said recess and provided with bearings at the ends for engaging said recess-bearings and with pin-apertures for registering with said pin-sockets, pins engaging said sockets and extending into said pin-apertures, said hub having an oil-duct leading thereinto for supplying lubricant to said recess and the interior of said bushing.

3. A wheel-hub having a longitudinal recess with the walls contracted at two sides and with bearings at the ends and lateral pin-sockets intermediately of the bearings, an axle-bushing for position in said recess and engaging the contracted walls of the same and provided with bearings at the ends for engaging said recess-bearings and with pin-apertures for registering with said sockets, pins engaging said sockets and extending into said pin-apertures, said hub having an oil-duct leading thereinto for supplying lubricant to said recess and bushing.

In testimony that we claim the foregoing as our own we have hereto affixed our signatures in the presence of two witnesses.

JOHN M. WESLEY.
WILLIAM H. McCRADY.

Witnesses:
FLORA BELLE JONES,
GUS A. JOHNSON.